(12) United States Patent
Robertson

(10) Patent No.: US 10,215,408 B2
(45) Date of Patent: Feb. 26, 2019

(54) METHOD AND APPARATUS FOR DIFFUSE COMBUSTION OF PREMIX

(71) Applicant: Fives North American Combustion, Inc., Cleveland, OH (US)

(72) Inventor: Thomas F. Robertson, Medina Township, OH (US)

(73) Assignee: Fives North American Combustion, Inc., Cleveland, OH (US)

( * ) Notice: Subject to any disclaimer, the term of this patent is extended or adjusted under 35 U.S.C. 154(b) by 590 days.

(21) Appl. No.: 14/963,580

(22) Filed: Dec. 9, 2015

(65) Prior Publication Data

US 2017/0167725 A1    Jun. 15, 2017

(51) Int. Cl.
| | |
|---|---|
| F23N 1/02 | (2006.01) |
| F23N 5/26 | (2006.01) |
| F23Q 13/00 | (2006.01) |
| F23N 5/12 | (2006.01) |
| F23Q 7/06 | (2006.01) |
| F23D 14/02 | (2006.01) |

(52) U.S. Cl.
CPC ............ *F23N 1/022* (2013.01); *F23D 14/02* (2013.01); *F23N 5/123* (2013.01); *F23N 5/265* (2013.01); *F23Q 7/06* (2013.01); *F23Q 13/00* (2013.01); *F23C 2900/99001* (2013.01); *F23C 2900/99006* (2013.01); *F23N 2027/02* (2013.01)

(58) Field of Classification Search
CPC ........... F23D 14/02; F23C 2900/99001; F23N 2037/02
USPC ...................................... 431/12, 75; 110/190
See application file for complete search history.

(56) References Cited

U.S. PATENT DOCUMENTS

| | | |
|---|---|---|
| 5,570,679 A | 11/1996 | Wunning |
| 6,312,250 B1 | 11/2001 | Neville et al. |
| 6,824,383 B2 | 11/2004 | Cain |
| 2004/0091830 A1 | 5/2004 | Wunning et al. |
| 2005/0074711 A1 | 4/2005 | Cain et al. |
| 2008/0081301 A1 | 4/2008 | Hannum et al. |
| 2009/0133854 A1 | 5/2009 | Johnson et al. |

(Continued)

FOREIGN PATENT DOCUMENTS

| | | |
|---|---|---|
| EP | 0962702 A1 | 12/1999 |
| JP | 2001-021145 A | 1/2001 |

(Continued)

OTHER PUBLICATIONS

J.G. Wünning, "FLOX—Flameless Combustion", Thermprocess Symposium, 2003, 19 pages.

(Continued)

*Primary Examiner* — Jorge A Pereiro
(74) *Attorney, Agent, or Firm* — Benesch, Friedlander, Coplan & Aronoff LLP

(57) ABSTRACT

A method directs fuel-oxidant premix into a reaction zone through a first total premix inlet flow area, and causes the premix to combust and form a stable flame projecting into a process chamber through an outlet from the reaction zone. At a time when the process chamber has a temperature at or above an auto-ignition temperature of the fuel, the flame is blown off to initiate diffuse combustion in the process chamber without a stable flame. The flame is blown off by directing the premix into the reaction zone through a second total premix inlet flow area greater than the first total premix inlet flow area.

17 Claims, 2 Drawing Sheets

(56) References Cited

U.S. PATENT DOCUMENTS

| | | | |
|---|---|---|---|
| 2009/0136406 A1 | 5/2009 | Johnson et al. | |
| 2014/0080072 A1* | 3/2014 | Smirnov | F23L 9/00 |
| | | | 431/6 |
| 2014/0272735 A1 | 9/2014 | Newby | |
| 2014/0272737 A1 | 9/2014 | Robertson et al. | |

FOREIGN PATENT DOCUMENTS

| | | |
|---|---|---|
| JP | 3194081 B2 | 7/2001 |
| JP | 3774288 B2 | 5/2006 |

OTHER PUBLICATIONS

J.A. Wünning and J.G. Wünning, "Flameless oxidation to reduce thermal no-formation", Progress in Energy and Combustion Science, vol. 23, Issue 1, 1997, pp. 81-94, Abstract only.

J.G. Wünning, "Handbook of burner technology for industrial furnaces : fundamentals, burner, applications", Vulkan-Verlag, 2009, pp. 60-61.

A. Milani and J. Wünning, "What is Flameless Combustion?", IFRF Online Combustion Handbook, Apr. 15, 2002, http://www.handbook.ifrf.net/handbook/cf.html?id=171.

J. Wünning, "Flameless Oxidation", 6th HiTACG Symposium, Essen, Germany, Oct. 2005.

* cited by examiner

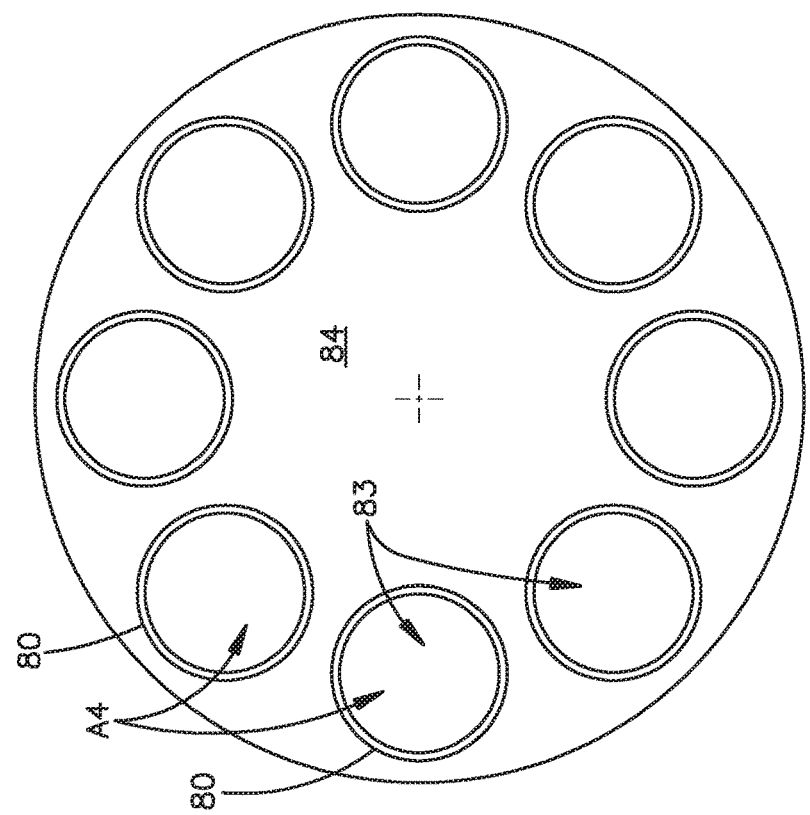
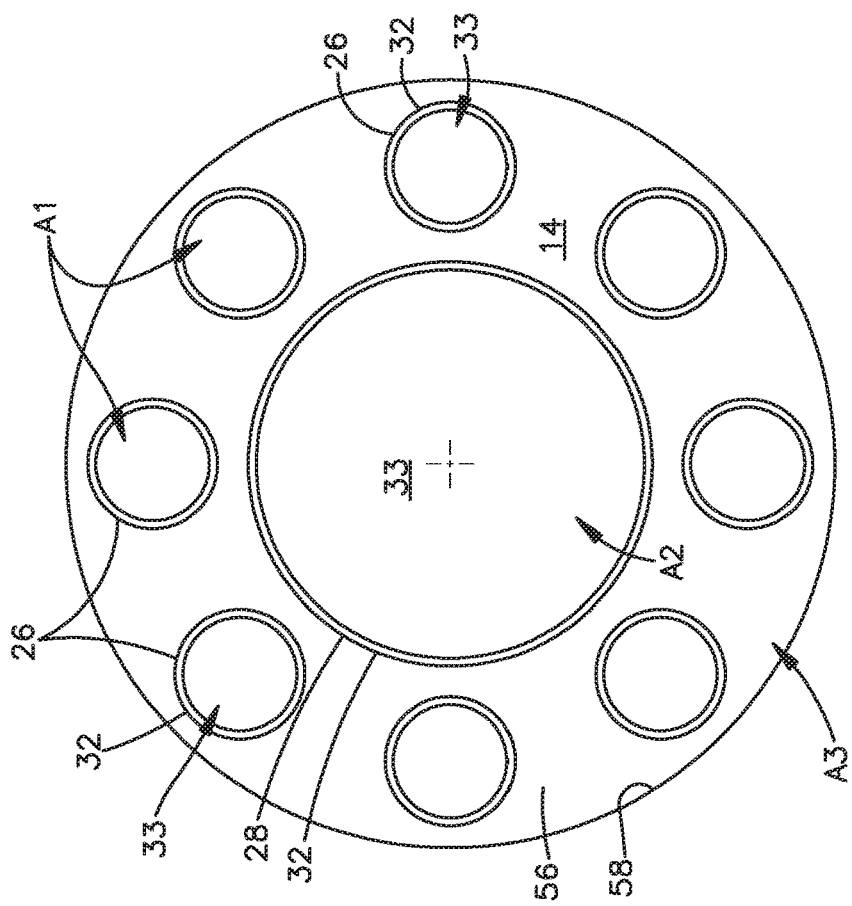

METHOD AND APPARATUS FOR DIFFUSE COMBUSTION OF PREMIX

TECHNICAL FIELD

This technology includes a burner having a reaction zone in which a premix of fuel and oxidant is ignited and combusts to form a flame that projects from the reaction zone into a furnace process chamber.

BACKGROUND

A furnace may have a process chamber in which a load is heated by products of combustion. The products of combustion are generated by reactants that are discharged from burners that fire into the process chamber. Each burner receives unignited streams of fuel and oxidant, and may have a reaction zone in which the fuel and oxidant are ignited and combust to form a flame. The reaction zone has an outlet through which the flame projects from the burner into the process chamber, and may be tapered at the outlet to stabilize the flame.

When the process chamber reaches an elevated temperature at or above an auto-ignition temperature of the fuel, it may be desirable to combust the reactants in a diffuse mode without a stabilized flame projecting from burner into the process chamber. A diffuse mode can be initiated by extinguishing the flame and continuing to discharge the reactants from the burner into the process chamber. As long as the process chamber has a temperature at or above an auto-ignition temperature of the fuel, the reactants will then ignite and combust in a diffuse mode in the process chamber.

SUMMARY

A method directs fuel-oxidant premix into a reaction zone through a first total premix inlet flow area, and causes the premix to combust and form a stable flame projecting into a process chamber through an outlet from the reaction zone. At a time when the process chamber has a temperature at or above an auto-ignition temperature of the fuel, the flame is blown off to initiate diffuse combustion in the process chamber without a stable flame. The flame is blown off by directing the premix into the reaction zone through a second total premix inlet flow area greater than the first total premix inlet flow area.

The reaction zone preferably has a tile-stable limit of premix inlet flow area, with the first total premix inlet flow area being less than the tile-stable limit, and the second total premix inlet flow area being greater that the tile stable limit.

The diffuse mode of combustion can be initiated by increasing the total premix inlet flow area sufficiently to blow off the flame while maintaining a constant total premix inlet flow rate. In this manner diffuse combustion is provided without increasing the firing rate at which the premix is ignited upon entering the reaction zone.

An apparatus for performing the method may include a burner and a reactant supply and control system. The burner may have a reaction zone with an outlet structure configured for flame stabilization, first inlet ports with first flow areas, and a second inlet port with a second flow area greater than a sum of the first flow areas. The apparatus may further include a reactant supply and control system configured to direct fuel-oxidant premix into the reaction zone in a first mode through the first inlet ports but not through the second inlet port, and alternatively in a second mode through the second inlet port but not through the first inlet ports.

The reactant supply and control system may be alternatively be configured to direct fuel-oxidant premix into the reaction zone in the first mode through one or more first inlet ports but not through one or more second inlet ports, and alternatively in a second mode through both first and second inlet ports.

BRIEF DESCRIPTION OF THE DRAWINGS

FIG. 2 is a view taken on line 2-2 of FIG. 1.

FIG. 3 is a view similar to FIG. 2, showing an alternative embodiment.

DESCRIPTION

Figure 1:
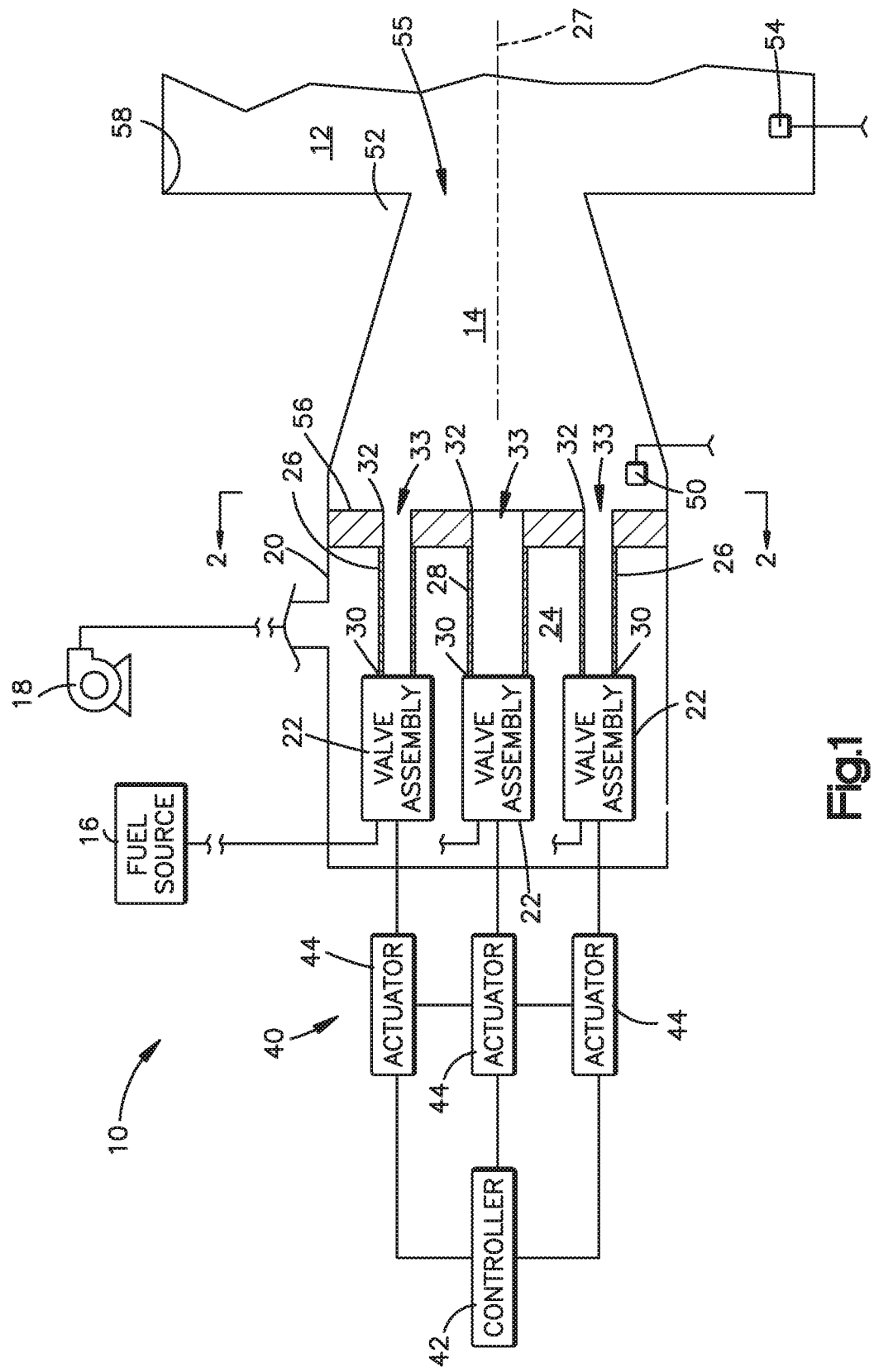
FIG. 1 is a schematic view of parts of a furnace including a burner that fires into a process chamber.

The apparatus shown schematically in the drawings has parts that are examples of the elements recited in the apparatus claims, and can be operated in steps that are examples of the steps recited in the method claims. These examples are described here to provide enablement and best mode without imposing limitations that are not recited in the claims.

As shown schematically in FIG. 1, an apparatus includes a burner 10. The burner 10 is part of an industrial furnace having a process chamber 12. A drying or other heating process is performed on a load (not shown) in the chamber 12. Thermal energy for the heating process is generated in a reaction zone 14 in the burner 10. This occurs upon combustion of a fuel and oxidant mixture in the reaction zone 14. Specifically, the burner 10 of FIG. 1 is a premix burner in which fuel (preferably natural gas) from a fuel source 16 is mixed with oxidant (preferably atmospheric air) from an oxidant source 18 to form fuel-oxidant premix. The premix is ignited and undergoes combustion in the reaction zone 14 to provide thermal energy to the adjoining process chamber 12.

The parts of the burner 10 that are shown in FIG. 1 include a housing structure 20 and a plurality of valve assemblies 22. An oxidant supply plenum 24 is defined within the housing structure 20. A group of mixer tubes 26, two of which are shown in FIG. 1, are arranged in the housing structure 20 in a cylindrical array centered on an axis 27. Another mixer tube 28 is centered on the axis 27. The inner ends 30 of the mixer tubes 26 and 28 are located in the plenum 24. The outer ends 32 of the mixer tubes 26 and 28 define respective ports 33 that are inlets to the reaction zone 14.

In the given example, the inlet ports 33 at the cylindrical array of mixer tubes 26 are sized and shaped equally, as shown in FIG. 2, such that each has a first flow area A1. The inlet port 33 at the central mixer tube 28 is larger with a second flow area A2. The second flow area A2 is greater than the sum of the first flow areas A1.

The valve assemblies 22 are operative to provide controlled flows of oxidant and fuel along the mixer tubes 26 and 28 to form premix before those reactants enter the reaction zone 14. All of the valve assemblies 22 in this example are located within the plenum 24 so as to share a common supply of oxidant from the oxidant source 18. Each valve assembly 22 receives a supply of fuel from the fuel source 16 separately from each other valve assembly 22, and is operatively engaged with the inner end 30 of a single corresponding mixer tube 26 or 28 to provide the corresponding mixer tube 26 or 28 with a controlled flow of oxidant and fuel.

As further shown schematically in FIG. 1, the valve assemblies 22 are included in a reactant supply and control system 40 with a controller 42 and a corresponding plurality of actuators 44. The valve assemblies 22, as well as the actuators 44, are preferably alike and may be configured to operate for on-off as well as modulated control of their respective flow rates of fuel and oxidant as shown and described in U.S. Pat. No. 6,312,250, which is incorporated by reference. The controller 42 may comprise any suitable programmable logic controller or other control device, or combination of control devices, that is programmed or otherwise configured to perform as described in U.S. Patent Publication No. 2014/0272735, which also is incorporated by reference, and to perform further as described and claimed herein.

In a typical mode of operation, the controller 42 maintains the valve assemblies 22 at the array of mixer tubes 26 open while maintaining the valve assembly 22 at the central mixer tube 28 closed. Premix then flows into the reaction zone 14 through a total premix inlet flow area equal to the sum of the first flow areas A1. The controller 42 operates an igniter/flame detector assembly 50 for the premix to ignite and combust within the reaction zone 14, and to form a stable flame projecting the axis 27. An outer end portion 52 of the reaction zone 14 is tapered inwardly toward an outlet port 55 to accelerate the flame as it projects from the reaction zone 14 into the process chamber 12 through the outlet port 55.

Further regarding the flow areas A1 and A2, the inlet ports 33 are located at an inner end wall 56 of the reaction zone 14. The periphery 58 (FIG. 2) of the inner end wall 56 provides the reaction zone 14 with a cross-sectional area A3 in which the flow areas A1 and A2 are included. Moreover, the reaction zone 14 has a tile-stable limit of premix inlet flow area above which the tapered outer end portion 52 can not maintain stability of the flame. The sum of the first flow areas A1 is preferably less than the tile-stable limit, and the second flow area A2 is preferably greater than the tile-stable limit. In a preferred embodiment, the tile-stable limit of the reaction zone 14 is 23% of the cross-sectional area A3. The sum of the first flow areas A1 is less than 23% of A3. The second flow area is greater than 23% of A3.

The controller 42 monitors a sensor 54 that detects a temperature in the process chamber 12 and, at a time when the process chamber 12 has a temperature at or above an auto-ignition temperature of the fuel, can initiate a diffuse mode of combustion, i.e. a mode of combustion without a stabilized flame. Known steps that may be taken to initiate a diffuse mode of combustion are described in U.S. Patent Application Publication No. 2014/0272735. In the present case a diffuse mode is preferably initiated by increasing the total premix inlet flow area sufficiently to blow off the flame in the reaction zone 14.

For example, if the apparatus of FIGS. 1 and 2 is being operated with a stable flame in the mode described above, the transition to diffuse combustion can be accomplished by closing the valve assemblies 22 at the cylindrical array of mixer tubes 26 to block the flow of fuel and oxidant through those mixer tubes 26, and by opening the valve assembly 22 at the central mixer tube 28 to direct a flow of fuel and oxidant through that mixer tube 28. The total premix inlet flow area is thereby increased from the sum of the first flow areas A1 to the greater value of the second flow area A2. The total premix inlet flow rate also can be increased, but since the second flow area A2 is greater than the tile-stable limit of the reaction zone 14, the shift up to A2 ensures that the flame will be blown off even if the valve assemblies 22 are operated to maintain a constant total flow rate of premix into the reaction zone 14 when making the transition from the stable-flame mode to the diffuse mode. Diffuse combustion can thus be provided without increasing the premix firing rate.

As shown in FIG. 3, an alternative embodiment has an array of mixer tubes 80 with outer ends providing inlet ports 83 to a corresponding reaction zone 84. One or more of the inlet ports 83 may have a flow area that is greater or less than the flow area of one or more of the others. However, in the illustrated example, the inlet ports 83 all have equal flow areas A4. In a stable flame mode, premix is directed through a first group of the inlet ports 83 having a total flow area less than the tile stable limit of the reaction zone 84. The shift to a diffuse combustion mode is accomplished by directing premix through a second group of the inlet ports 83 having a total flow area greater than tile stable limit of the reaction zone 84.

This written description sets for the best mode of carrying out the invention, and describes the invention so as to enable a person skilled in the art to make and use the invention, by presenting examples of the elements recited in the claims. The patentable scope of the invention is defined by the claims, and may include other examples that do not differ from the literal language of the claims, as well as equivalent examples with insubstantial differences from the literal language of the claims.

What is claimed is:

1. A method comprising:
directing fuel-oxidant premix into a reaction zone through a first total premix inlet flow area;
causing the premix to combust and form a stable flame projecting into a process chamber through an outlet from the reaction zone; and
blowing off the flame at a time when the process chamber has a temperature at or above an auto-ignition temperature of the fuel, and thereby initiating diffuse combustion in the process chamber, by directing the premix into the reaction zone through a second total premix inlet flow area greater than the first total premix inlet flow area.

2. A method as defined in claim 1 wherein the reaction zone has a tile-stable limit of premix inlet flow area, the first total premix inlet flow area is less than the tile-stable limit, and the second total premix inlet flow area is greater that the tile-stable limit.

3. A method as defined in claim 1 wherein the premix is directed into the reaction zone through the first total premix inlet flow area at a first total flow rate, and the flame is blown off by directing the premix into the reaction zone through the second total premix inlet flow area at a second total flow rate equal to the first total flow rate.

4. A method as defined in claim 1 wherein the reaction zone has an inner end wall with a periphery defining a cross-sectional area of the reaction zone, the first and second total premix inlet flow areas are provided at the inner end wall, the first total premix inlet flow area is less than 23% of the cross-sectional area, and the second total premix inlet flow area is greater than 23% of the cross-sectional area.

5. A method comprising:
directing fuel-oxidant premix into a reaction zone at a total flow rate through a first total premix inlet flow area;
causing the premix to combust and form a stable flame projecting into a process chamber through an outlet from the reaction zone; and while maintaining the total flow rate constant, and at a time when the process chamber has a temperature at or above an auto-ignition temperature of the fuel, initiating diffuse combustion in the process chamber by increasing the total premix inlet flow area sufficiently to blow off the flame.

6. A method as defined in claim 5 wherein the reaction zone has a tile-stable limit of premix inlet flow area, and the total premix inlet flow area is increased from below the tile-stable limit to above the tile-stable limit.

7. A method as defined in claim 5 wherein the reaction zone has an inner end wall with a periphery defining a cross-sectional area of the reaction zone, and the total premix inlet flow area is increased from less than 23% of the cross-sectional area to greater than 23% of the cross-sectional area.

8. An apparatus comprising:
means for directing fuel-oxidant premix into a reaction zone through a first total premix inlet flow area;
means for causing the premix to combust and form a stable flame projecting into a process chamber through an outlet from the reaction zone; and
means for blowing off the flame at a time when the process chamber has a temperature at or above an auto-ignition temperature of the fuel, and thereby initiating diffuse combustion in the process chamber, by directing the premix into the reaction zone through a second total premix inlet flow area greater than the first total premix inlet flow area.

9. An apparatus as defined in claim 8 wherein the reaction zone has a tile-stable limit of premix inlet flow area, the first total premix inlet flow area is less than the tile-stable limit, and the second total premix inlet flow area is greater that the tile stable limit.

10. A method as defined in claim 8 wherein the reaction zone has an inner end wall with a periphery defining a cross-sectional area of the reaction zone, the first and second total premix inlet flow areas are provided at the inner end wall, the first total premix inlet flow area is less than 23% of the cross-sectional area, and the second total premix inlet flow area is greater than 23% of the cross-sectional area.

11. An apparatus comprising:
a burner having a reaction zone with an outlet structure configured for flame stabilization, first inlet ports having first flow areas, and a second inlet port having a second flow area greater a sum of the first flow areas; and
a reactant supply and control system that directs fuel-oxidant premix into the reaction zone in a first mode through the first inlet ports but not through the second inlet port, and alternatively in a second mode through the second inlet port but not through the first inlet ports;
wherein the reaction zone has a tile-stable limit of premix inlet flow area, the sum of the first flow areas is less than the tile-stable limit, and the second flow area is greater that the tile stable limit.

12. An apparatus as defined in claim 11 wherein the reactant supply and control system directs fuel-oxidant premix into the reaction zone through only the first inlet ports in the first mode and through only the second inlet port in the second mode.

13. An apparatus as defined in claim 11 wherein the reaction zone has an inner end wall with a periphery defining a cross-sectional area of the reaction zone, the first and second flow areas are located at the inner end wall, the sum of the first flow areas is less than 23% of the cross-sectional area, and the second flow area is greater than 23% of the cross-sectional area.

14. An apparatus comprising:
a burner having a reaction zone with an outlet structure configured for flame stabilization;
the reaction zone further having inlet ports, the inlet ports consisting of first inlet ports having first flow areas and a second inlet port having a second flow area greater than a sum of the first flow areas.

15. An apparatus as defined in claim 14 further comprising a reactant supply and control system that directs fuel-oxidant premix into the reaction zone in a first mode through only the first inlet ports and alternatively in a second mode through only the second inlet port.

16. An apparatus as defined in claim 14 wherein the reaction zone has a tile-stable limit of premix inlet flow area, the sum of the first flow areas is less than the tile-stable limit, and the second flow area is greater that the tile stable limit.

17. An apparatus as defined in claim 14 wherein the reaction zone has an inner end wall with a periphery defining a cross-sectional area of the reaction zone, the first and second flow areas are located at the inner end wall, the sum of the first flow areas is less than 23% of the cross-sectional area, and the second flow area is greater than 23% of the cross-sectional area.

* * * * *